United States Patent [19]

Jones

[11] 4,086,432
[45] Apr. 25, 1978

[54] SWITCHING CIRCUIT USEFUL IN TELEPHONE CONFERENCE SYSTEMS

[75] Inventor: Ralph Archibald Jones, London, England

[73] Assignee: The Post Office, London, England

[21] Appl. No.: 749,780

[22] Filed: Dec. 13, 1976

[51] Int. Cl.² ............... H04M 3/56; H02M 7/00; H03F 1/36
[52] U.S. Cl. ............... 179/1 CN; 179/1 SW; 330/110; 329/203
[58] Field of Search .............. 179/1 CN, 1 SW, 17 R, 179/1 VC; 330/110; 329/203

[56] References Cited

U.S. PATENT DOCUMENTS

| | | | |
|---|---|---|---|
| 3,187,325 | 6/1965 | Waldhauer | 330/110 |
| 3,483,478 | 12/1969 | Shigaki | 330/110 |
| 3,537,025 | 10/1970 | Baum et al. | 330/110 |
| 3,553,566 | 1/1971 | Nagy | 330/110 |
| 3,579,138 | 5/1971 | Harris | 330/110 |
| 3,816,917 | 6/1974 | Jones | 179/1 CN |
| 3,818,139 | 6/1974 | Snyder | 179/1 CN |

OTHER PUBLICATIONS

M. Peard, "Conference Circuit for Telephone Exchange," IBM Tech. Discl. Bull., Apr., 1970.

Primary Examiner—Thomas W. Brown
Assistant Examiner—E. S. Kemeny
Attorney, Agent, or Firm—Hall & Houghton

[57] ABSTRACT

A switching circuit comprises an operational amplifier with two resistive negative feedback paths including respective unilaterally conducting devices (e.g. diodes) connected in opposite polarity to the output of the amplifier. A first terminal is connected to the electrode of the unilaterally conducting device in one path remote from the output of the amplifier, and a second terminal is connected to the electrode of the unilaterally conducting device in the other path remote from the output of the amplifier. Signals of one polarity only applied to the first terminal appear at the second terminal and signals of the opposite polarity only applied to the second terminal appear at the first terminal. The circuit may include three or more such feedback paths. The values of the resistors in the feedback paths may be adjusted to charge the transfer gain of the circuit. The circuit is of particular value in a telephone conference amplifier using unilateralized signals for connecting each channel to a point common to the channels.

11 Claims, 4 Drawing Figures

SWITCHING CIRCUIT USEFUL IN TELEPHONE CONFERENCE SYSTEMS

This invention relates to a switching circuit which is of particular value in telephone conference systems.

In telephone conference systems it has been proposed to convert a speech signal to be distributed to telephone lines joined together for the purpose of the conference to a unilateralised signal. A unilateralised or unidirectional polarity signal is a signal which normally alternates about the zero voltage level, but which has been offset relative to the zero voltage level so that the signal is always of the same polarity, with the limitation that a signal of zero voltage produces a unilateralised signal of zero voltage. A method of unilaterlising a signal is to derive from it an envelope signal and then add this envelope signal to the original with such amplitude that the resulting signal does not cross the zero voltage level. A unilateralised signal is used in a conference telephone circuit in the following way.

Each channel taking prt in the conference is connected to a common point by a diode circuit such that signals originating in that channel after unilateralisation can be applied through the diode to the common point. The channels are also connected to respond to the presence of signals at the common point of such polarity as would be produced by a unilateralised signal originating in one of the channels so that that signal can be received by all of the other channels.

In U.S. Pat. No. 3,816,917 a telephone conference system of the above type is described. However, the circuits described in the above specification are relatively complex.

It is an object of the present invention to provide a switching circuit which is suitable for use in a telephone conference amplifier of simpler construction than that described in the above patent specification.

According to the present invention there is provided a switching circuit including an inverting d.c. amplifier with first and second resistive negative feedback paths having respectively first and second unilaterally conducting devices connected in opposite polarity to the output of the amplifier, a first terminal being connected to the electrode of the first unilaterally conducting device remote from the output of the amplifier and a second terminal being connected to the electrode of the second unilaterally conducting device remote from the output of the amplifier, whereby only an input signal of polarity such as to cause the first unilaterally conducting device not to conduct appears as an output signal of opposite polarity at the second terminal and only an input signal of such opposite polarity applied to the second terminal appears at the first terminal as an output signal of the first polarity.

According to a second aspect of the invention there is provided a telephone conference amplifier having a plurality of channels, each channel including means for receiving an input signal and producing therefrom a unidirectional polarity signal, switch means including an inverting d.c. amplifier with first and second resistive negative feedback paths having respectively first and second unilaterally conducting devices connected in opposite polarity to the output of the amplifier, means for applying the unidirectional polarity signal from the producing means to the electrode of the first unilaterally conducting device remote from the output of the amplifier, the polarity of the first unilaterally conducting device being such that the unidirectional polarity signal does not cause it to conduct, means connecting the electrode of the second unilaterally conducting device remote from the output of the amplifier to a point common to all of the channels, and means connected to the output of the inverting d.c. amplifier to derive therefrom, in response to a unidirectional polarity signal from the common point, a unidirectional polarity signal of the same polarity as that applied to the electrode of the first unilaterally conducting device and to produce a symmetrically polarised output signal.

In one embodiment of the invention the first unilaterally conducting device includes an emitter-base diode of a transistor.

A switching circuit according to the invention may include a third resistive negative feedback path having a third unilaterally conducting device connected to the output of the amplifier which unilaterally conducting device is connected in the same polarity as the first unilaterally conducting device. If such a switching circuit is connected as part of a telephone conference amplifier the symmetrically polarised output signal may be derived from a undirectional polarity signal established at the electrode of the third unilaterally conducting device remote from the output of the amplifier. The switching circuit may include more than three resistive negative feedback paths each having a unilaterally conducting device.

A telephone conference amplifier according to the invention may include a connection for d.c. signals from the means connected to the output of the inverting d.c. amplifier to derive therefrom a unidirectional polarity signal in response to a unidirectional signal applied to the common point by another channel to the means for receiving an input signal. This is for the purpose of reducing the sensitivity of the means for receiving the input signal when a unidirectional polarity signal is being applied to the common point by another channel.

A telephone conference amplifier according to the invention may also include a positive feedback connection for d.c. signals from the output of the inverting d.c. amplifier to the means for receiving an input signal. This is for the purpose of maintaining the unidirectional nature and the switching of signals at low levels at which unilateralisation by the means for receiving and switching by the switch means can be imperfect.

In order that the invention may be fully understood and readily carried into effect it will now be described with reference to the accompanying drawings, of which:

Figure 1:
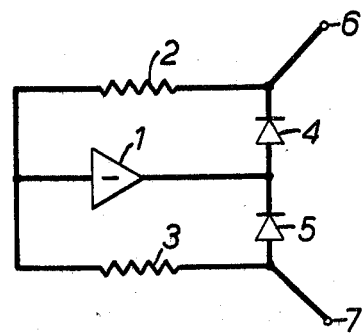
FIG. 1 is a diagram of one example of the switching circuit according to the invention.

Referring now to FIG. 1, the switching circuit shown includes an inverting d.c. amplifier 1 to the input of which are connected resistors 2 and 3, which may be of equal value but are not necessarily so. The output of the amplifier 1 is connected to the resistor 2 through a diode 4 and to the resistor 3 through a diode 5. The anode of the diode 4 and the cathode of the diode 5 are connected to the output of the amplifier 1. A first terminal 6 is connected to the resistor 2 and the cathode of the diode 4. A second terminal 7 is connected to the resistor 3 and the anode of the diode 5.

In the operation of the circuit shown in FIG. 1 a positive-going input signal applied to the terminal 6 is routed through the resistor 2 to the input of the amplifier 1 because the diode 4 does not conduct. The positive-going input of the amplifier 1 produces a negative-going signal at its output which is able to pass through the diode 5 and resistor 3 so that a conventional see-saw amplifier circuit is produced with the result that a negative-going output signal appears at the terminal 7 being related to the magnitude of the input signal applied to the terminal 6 in the same proportion as the value of the resistor 3 to the value of the resistor 2. If a negative-going input signal were applied to the terminal 6, any part of the signal which reaches the input of the amplifier 1 would appear at the output of the amplifier 1 as a positive-going signal so that the terminal 6 is held at zero voltage by the conduction of the diode 4 and consequently no output signal appears at the terminal 7. By symmetry a negative-going signal applied as an input to the terminal 7 will appear as a positive-going output signal at the terminal 6 related to the magnitude of the input signal by the ratio of the value of the resistor 2 to the value of the resistor 3. Further, a positive-going input applied to the terminal 7 produces no output at the terminal 6 because of the conduction of the diode 5.

This circuit is of particular value in telephone conference amplifiers in which it is required to apply to a point common to all of the channels of the amplifier a unidirectional polarity signal from the channel which is active at the time, that is to say the channel which has a speech input. The unidirectional polarity signal applied to the common point is required to be derived from the common point by all of the channels other than the active channel. A switching circuit according to the invention would be used in such an amplifier, one to each channel with the common point connected to, for example, the second terminal 7 and the unidirectional polarity signal derived from the input signal to the channel being applied to the first terminal 6.

The switching circuit may include a third resistive negative feedback path having a further resistor connected to the input of the amplifier 1 and a further diode connected to the output of the amplifier 1, the further diode must of course be connected in the same polarity as one or other of the diodes 4 and 5, and in the example to be described below it is in the same polarity as the diode 4 for application to a telephone conference amplifier.

Figure 1A:
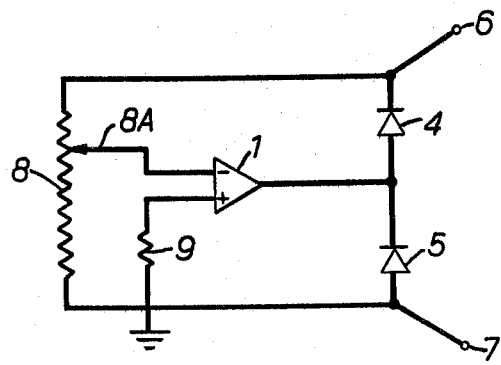
FIG. 1A shows a modification of FIG. 1.

In FIG. 1, it will be apparent that the relation between the magnitudes of the resistances 2 and 3 determines the relation between the amplitudes of the input and output signals. FIG. 1A shows a modification of the circuit of FIG. 1 in which the feedback resistors 2 and 3 are replaced by a potentiometer 8 having a wiper 8A which is connected to the inverting input of the amplifier 1. Adjustment of the position of the wiper 8A changes the relationship between the amplitudes of the input and output signals of the circuit. The non-inverting input of the amplifier 1 may be connected to earth directly or through a resistor 9 as shown in FIG. 1A.

Figure 2:
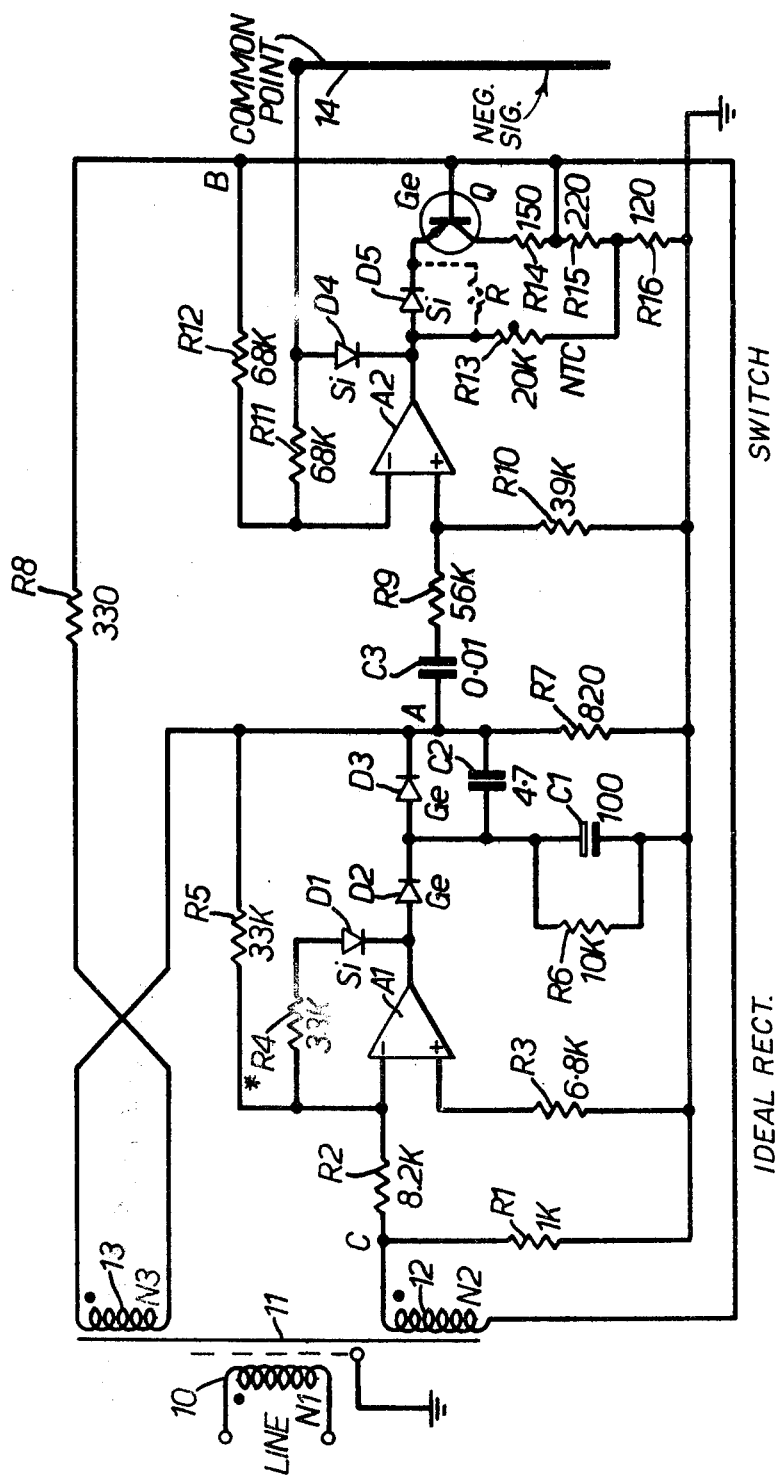
FIG. 2 is a diagram of one example of a channel of a telephone conference amplifier according to the invention and using a switching circuit according to the invention.

FIG. 2 shows one channel of a telephone conference amplifier in which the two-wire telephone line is connected to the primary winding 10 of a transformer 11. A secondary winding 12 of the transformer 11 is connected to an ideal diode circuit formed by a d.c. amplifier A1 having two resistive negative feedback paths, the first having a resistor R4 in series with a diode D1 and the second having a resistor R5 in series with diodes D2 and D3. The cathode of the diode D1 and the anode of the diode D2 are connected to the output of the amplifier A1. At a point A connected to the cathode of the diode D3 a signal representing the envelope of any input speech waveform applied to the winding 10 is set up, being smoothed by the capacitor C1 and resistors R6 and R7 in parallel. The point A is connected through a second secondary winding 13 of the transformer 11 and a resistor R8 to a point B at which is established the sum of an incoming speech waveform and its envelope, which together form a unidirectional polarity signal. In the present example this signal is positive-going. The point B is connected via resistor R12 to the inverting input of an amplifier A2 which has a first resistive negative feedback path formed by a resistor R11 in series with a diode D4 and a second resistive negative feedback path formed by a resistor R12 in series with a diode D5 and the base emitter diode of a transistor Q. As can be seen, the point B is connected to the base of the transistor Q. A negative-going unidirectional polarity signal is set up by the amplifier 2 at the anode of the diode D4, which electrode is connected to the common point, in this instance shown as a conductor 14. The common point is common to all channels of the conference amplifier. The collector of the transistor Q is connected to earth through resistors R14, R15 and R16 in series, the junction of resistors R14 and R15 being connected to the lower end of the winding 12, and the junction of the resistors R15 and R16 being connected to the output of the amplifier A2 through a negative temperature coefficient resistor R13.

The point A is connected through a capacitor C3 and resistor R9 to the non-inverting input of the amplifier A2, which is connected to ground through a resistor R10, the function of the signal fed through the capacitor C3 being to correct some signal distortions which occur because capacitor C2 is connected in shunt with the diode D3 and not to earth as shown in the above patent specification. The operation of this part of the circuit is discussed more fully in the specification of co-pending U.S. patent application Ser. No. 739,975 and will not be considered further in this specification.

In the operation of the circuit of FIG. 2, the positive going unidirectional polarity signal appearing at point B is applied through the resistor R12 to the non-inverting input of the amplifier A2 because the base emitter diode of the transistor Q and the diode D5 are turned off by the positive-going signal. A negative-going output signal appears at the output of the amplifier A2 and is therefore applied to the common point 14 through the diode D4. Because the transistor Q is turned off by the positive-going signal at the point B no positive voltage is applied to the lower end of the winding 12 because no collector current is flowing through the transistor Q. Thus in an active channel the sensitivity of the amplifier A1 is maintained because a positive-going signal is not applied to its non-inverting input tending to prevent the production of an envelope signal at the point A. Moreover, when at the end of an utterance the voltage at point B falls towards zero, the voltage at the output of amplifier 2 falls towards 1V (the sum of the knee voltages of diode D5 and the emitter-base of transistor Q) so that the positive feedback path from the output of amplifier A2 to the inverting input of amplifier A1 via resistors R13 and R15 becomes effective. This maintains the output at point A at a few tens of millivolts. The effect is known as retention because it causes retention of control of the common point by an active channel during natural breaks in the speech in that channel. One advantage of retention is that distortion of very low level signals during the unilateralisation and switching processes is avoided. Temperature compensation is discussed in the specification of the aforesaid co-pending U.S. patent application Ser. No. 739,975.

In a non-active channel the negative-going signal on the common point 14 is applied to the input of the amplifier A2 through the resistor R11 because the diode D4 does not conduct, so that a positive output signal appears at the output of the amplifier A2 and the diode D5 and transistor Q become conducting. A positive-going unidirectional polarity signal appears at the point B and induces a corresponding symmetrically polarised output signal in the winding 10 because the speech components are able to pass through the winding 13 and capacitors C2 and C1 to earth. Because the transistor Q is conducting a positive voltage is applied to the lower end of the winding 12 which biases into non-conduction the ideal diode formed by the amplifier A1 and its associated components. This prevents the formation of a d.c. voltage at point A which would oppose the conduction of diode D5 and the switching on of transistor Q causing malfunction of the circuit. Furthermore spurious low level signals appearing in the winding 10 of a non-active channel do not appear as corresponding signals at the common point 14 because the non-conduction of diodes D2 and D3 prevents the formation of an envelope component. They may however appear in a mutilated form which it is thought contributes to the "break-in" facility.

The negative temperature coefficient of resistor R13 is provided to compensate for the variation with temperature of the forward voltage drop across the diode D4 under retention conditions. It has been found that the compensation with only the resistor R13 is not quite adequate and to increase it a resistor R of high value may be connected in parallel with the diode D5. If the transistor Q is a silicon one a resistor may also be connected from its collector to its emitter.

In order to match the circuit to the telephone line connected to the winding 10, it is desirable that the impedance of the circuit looking into the winding 10 should be as near to 600 ohms as possible. With regard to the circuit itself the input impedance is naturally high in the receive state and low in the send state.

If these impedances are arranged to be 1200 ohms and 300 ohms respectively the return loss to a 600 ohm line is the same in both cases and the overall insertion loss is a minimum when the two return losses are the same. The resistor R1 which is effectively on parallel with the winding 12 reduces in the impedance in the receive state and the resistor R8 connected in series with the winding 13 increases the impedance in the send state. It is not possible to achieve the desirable result of the circuit presenting 600 ohms impedance for both receive and send without incurring excessive insertion loss due to the losses resulting from the impedance adjustment. The values shown are by way of a compromise which produces a 2 dB insertion loss and 9½ dB return loss.

Figure 3:
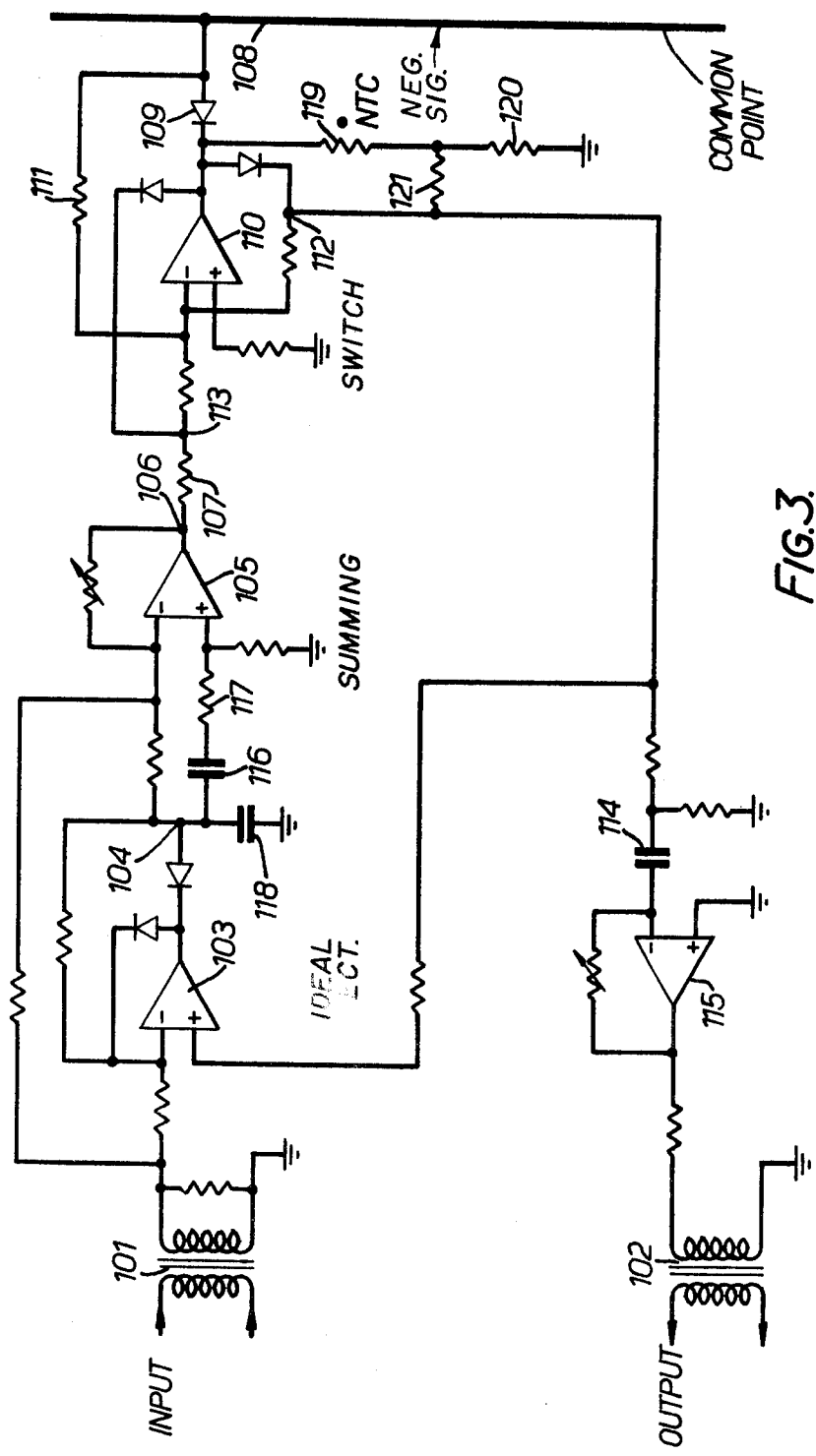
FIG. 3 is a diagram of one channel of a telephone conference amplifier according to a second example of the invention and including the second example of a switching circuit according to the invention.

FIG. 3 showns an alternative form of telephone conference amplifier with connections for a four-wire telephone circuit. The incoming signals are received via a transformer 101 and the signals are returned to the telephone line via a transformer 102. An ideal diode circuit 103 is provided to produce at the point 104 the envelope of the signal incoming via transformer 101. This envelope signal is combined with the incoming signal in a summing amplifier 105 so that at the point 106 a unidirectional polarity signal is produced. The point 106 is connected through a resistor 107 to one terminal of a switching circuit according to an example of the invention having three resistive negative feedback loops. As the unidirectional polarity signal is positive-going at the point 106 a negative-going signal is applied to the common point represented by the line 108 through a diode 109.

Negative-going signals from the common point 108 are applied to the input of amplifier 110 through a resistor 111 so that a positive-going signal appears at the points 112 and 113 in the third and first negative feedback loops respectively. The signal at the point 113 cannot proceed further back to the circuit because it is stopped by the summing amplifier 105. The signal at the point 112, however, is applied via a capacitor 114 to the input of an amplifier 115 having a negative feedback path. At the output of the amplifier 115 appears a symmetrically polarised signal derived from the unidirectional polarity signal at the common point 108, the symmetrically polarised signal being applied via the transformer 102 back to the telephone circuit.

The point 112 is also connected to the non-inverting input of the amplifier in the ideal diode circuit 103 which serves to establish a threshold for the input signal which is effective for all channels except the active one. A capacitor 116 and resistor 117 in series are connected from the point 104 to the non-inverting input of the amplifier 105 for the purpose of reducing distortion in the envelope signal due to the fact that it is smoothed by a capacitor 118 only (discharge of capacitor 118 is through the two resistors connected to it). A negative temperature coefficient resistor 119 is connected in series with a fixed resistor 120 in a path between the output of the amplifier 110 and earth; the junction of the resistors 119 and 120 is connected to the point 112 through a resistor 121. The purpose of the negative temperature coefficient of resistor 119 is to compensate for temperature variation in the forward voltage of diode 109 so as to render the retention effect less dependent on temperature.

From a consideraton of FIG. 3 relative to FIG. 2 it will be apparent that the transistor of FIG. 2 has been omitted in FIG. 3, this being made possible by the use of the switching circuit having three negative feedback paths.

Although the invention has been described with reference to a specific example and its application to telephone conference amplifiers, it will be appreciated that alternative constructions for the invention are possible and that they may be employed in other applications. One possible alternative application of the invention is in analogue computing.

Advantages of the switch described above are that it is simpler than circuits previously proposed for the same function, it can give a lower aggregate insertion loss for signal transmission in both directions through a telephone conference amplifier using it when compared with prior proposals, and it can be fabricated using lower tolerance resistors than earlier circuits providing the same performance.

In FIG. 3 the switch has a 6 dB loss which is compensated by the amplifier 115. The circuit can enable a telephone conference amplifier to be constructed without germanium transistors.

I claim:

1. A switching circuit including an inverting d.c. amplifier with first and second resistive negative feedback paths having first and second resistors connected in series respectively with first and second unilaterally conducting devices connected in opposite polarity to the output of the amplifier, a first signal source and a second signal utilisation circuit connected to the electrode of the first unilaterally conducting device remote from the output of the amplifier and a second signal source and a first signal utilisation circuit connected to the electrode of the second unilaterally conducting device remote from the output of the amplifier, whereby only an input signal of polarity such as to cause the first unilaterally conducting device not to conduct can be applied from the first signal source to the first signal utilisation circuit and only an input signal of polarity such as to cause the second unilaterally conducting device not to conduct can be applied from the second signal source to the second signal utilisation circuit.

2. a circuit according to claim 1 wherein one of the unilaterally conducting devices includes the emitter base diode of a transistor.

3. A circuit according to claim 1 including more than three resistive negative feedback paths each including a resistor connected in series with a respective unilaterally conducting device connected to the output of the amplifier, at least one of the unilaterally conducting devices being connected in the opposite polarity to the other unilaterally conducting devices.

4. A circuit according to claim 1 wherein the resistive components of the first and second negative feedback paths are formed by a potentiometer the wiper of which is connected to the input of the amplifier, whereby the gain of the circuit can be varied by adjustment of the position of the wiper of the potentiometer.

5. A telephone conference amplifier having a plurality of channels, each channel including means for receiving an input signal and producing therefrom a unidirectional polarity signal, switch means including an inverting d.c. amplifier with first and second resistive negative feedback paths having first and second resistors connected in series respectively with first and second unilaterally conducting devices connected in opposite polarity to the output of the amplifier, means for applying the unidirectional polarity signal from the producing means to the electrode of the first unilaterally conducting device remote from the output of the amplifier, the polarity of the first unilaterally conducting device being such that the unidirectional polarity signal does not cause it to conduct, means connecting the electrode of the second unilaterally conducting device remote from the output of the amplifier to a point common to all of the channels and means connected to a point on the first resistive negative feedback path to derive therefrom, in response to a unidirectional polarity signal from the common point, a unidirectional polarity signal of the same polarity as that applied to the electrode of the first unilaterally conducting device and to produce therefrom a symmetrically polarised output signal.

6. An amplifier according to claim 5 in which the first unilaterally conducting device includes the emitter base diode of a transistor.

7. An amplifier according to claim 5, including a connection for d.c. signals from the means connected to the point on the first resistive negative feedback path to derive therefrom a unidirectional polarity signal in response to a unidirectional signal at the common point, the connection being connected to the means for receiving an input signal, whereby the sensitivity of the means for receiving an input signal is reduced when a unidirectional polarity signal is being applied to the common point by another channel.

8. An amplifier according to claim 5, in which the input signal is received from, and the output signal applied to, the same transmission line and the output and input impedances of the amplifier are arranged relative to the impedance of the line so as to produce substantially the same return loss on an input signal received from the line as it produces on an output signal applied to the line.

9. A switching circuit including an inverting d.c. amplifier with first, second and third resistive negative feedback paths having first, second and third resistors connected in series respectively with first, second and third unilaterally conducting devices, the second device being connected in opposite polarity to the other two devices to the output of the ampfier, a first signal source connected to the electrode of the first unilaterally conducting device remote from the output of the amplifier, a first signal utilisation circuit and a second signal source connected to the electrode of the second unilaterally conducting device remote from the output of the amplifier, and a second signal utilisation circuit connected to the electrode of the third unilaterally conducting device remote from the output of the amplifier, whereby only an input signal of polarity such as to cause the first unilaterally conducting device not to conduct can be applied from the first signal source to the first signal utilisation circuit, and only an input signal of polarity such as to cause the second unilaterally conducting device not to conduct can be applied from the second signal source to the second signal utilisation circuit.

10. A telephone conference amplifier having a plurality of channels, each channel including means for receiving an input signal and producing therefrom a unidirectional polarity signal, switch means including an inverting d.c. amplifier with first, second and third resistive negative feedback paths having first, second and third resistors connected in series respectively with first, second and third unilaterally conducting devices, the second unilaterally conducting device being connected in opposite polarity to the first and third devices to the output of the amplifier, means for applying the unidirectional polarity signal from the producing means to the electrode of the first unilaterally conducting device remote from the output of the amplifier, the polarity of the unidirectional polarity signal being such as not to cause the first unilaterally conducting device to conduct, means connecting the electrode of the second unilaterally conducting device remote from the output of the amplifier to a point common to all of the channels, and means connected to a point on the third resistive negative feedback path to derive therefrom, in response to a unidirectional polarity signal from the common point, a unidirectional polarity signal of the same polarity as that applied to the electrode of the first unilaterally conducting device and to produce therefrom a symmetrically polarised output signal.

11. An amplifier according to claim 10 including a connection for d.c. signals from the means connected to the point on the third resistive negative feedback path to derive therefrom a unidirectional polarity signal in response to a unidirectional signal at the common point, the connection being connected to the means for receiving an input signal, whereby the sensitivity of the means for receiving an input signal is reduced when a unidirectional polarity signal is being applied to the common point by another channel.

* * * * *

UNITED STATES PATENT AND TRADEMARK OFFICE
CERTIFICATE OF CORRECTION

PATENT NO. : 4086432
DATED : April 25, 1978
INVENTOR(S) : Ralph Archibald Jones

It is certified that error appears in the above-identified patent and that said Letters Patent are hereby corrected as shown below:

[30] Foreign Application Priority Data

December 17, 1975   Great Britain   51587/75

Signed and Sealed this

Twenty-ninth Day of August 1978

[SEAL]

Attest:

RUTH C. MASON
Attesting Officer

DONALD W. BANNER
Commissioner of Patents and Trademarks